United States Patent [19]
Buchanan

[11] 3,766,526
[45] Oct. 16, 1973

[54] MULTI-MICROPROGRAMMED INPUT-OUTPUT PROCESSOR

[75] Inventor: James A. Buchanan, Houston, Tex.

[73] Assignee: The United States of America as represented by the United States Atomic Energy Commission, Washington, D.C.

[22] Filed: Oct. 10, 1972

[21] Appl. No.: 296,475

[52] U.S. Cl. .................... 340/172.5
[51] Int. Cl. .................... G06f 3/00
[58] Field of Search .................... 340/172.5; 235/151.13, 151.31

[56] References Cited

UNITED STATES PATENTS

| | | | |
|---|---|---|---|
| 3,559,187 | 1/1971 | Figueroa et al. | 340/172.5 |
| 3,573,741 | 4/1971 | Gavril | 340/172.5 |
| 3,654,617 | 4/1972 | Irwin | 340/172.5 |
| 3,662,349 | 5/1972 | Bartlett et al. | 340/172.5 |
| 3,673,576 | 6/1972 | Donaldson | 340/172.5 |
| 3,675,209 | 7/1972 | Trost et al. | 340/172.5 |
| 3,676,846 | 7/1972 | Busch | 340/146.1 BA |

*Primary Examiner*—Paul J. Henon
*Assistant Examiner*—James D. Thomas
*Attorney*—Roland A. Anderson

[57] ABSTRACT

A programmable input-output processor has been provided for use with multiple channel data acquisition systems such as the CAMAC dataway, a standardized digital system that is capable of handling vast amounts of digital data. The processor acts as a branch driver which provides multiple channel direct memory access to a host computer via a single memory access interface. Command lists in computer memory select microprogrammed sequences, stored in a fast-access control memory, which transfer data between CAMAC devices and lists in computer memory.

6 Claims, 9 Drawing Figures

INSTRUCTION SET

| Format | Mnemonic | Description |
|---|---|---|
| OP / CTRL / S / D | MOV | MOVE S TO D, CONTROL |
| | INC | INCREMENT S, STORE IN D & S CTRL |
| | DEC | DECREMENT S, STORE IN D & S CTRL |
| | ADD | ADD (T) TO (S) STORE IN D, CTRL |
| | SUB | SUBTRACT (T) FROM (S) STORE IN D, CTRL |
| | IOR | INCLUSIVE OR (T),(S) STORE IN D, CTRL |
| | XOR | EXCLUSIVE OR (T),(S) STORE IN D, CTRL |
| | AND | AND (T),(S) STORE IN D, CTRL |
| OP / COND / ADDR | BRT | BRANCH TO ADDR IF COND TRUE<br>EXECUTE NEXT INSTR IF COND FALSE |
| | BRF | BRANCH TO ADDR IF COND FALSE<br>EXECUTE NEXT INSTR IF COND TRUE |
| | JVC | JUMP VIA LOW BYTE IN PSR |
| OP / MOD / ADDR | LD | LOAD (CM) AT ADDR INTO SEL REG |
| | STO | STORE (SEL REG) INTO CM AT ADDR |
| OP / MOD / ⊠ | SHF | SHIFT, LEFT OR RIGHT<br>NORMAL OR ROTATE<br>1 BIT OR 2 BIT |
| OP / ⊠ | RTN | RETURN VIA PSR B(7.0) |

FIG. 6

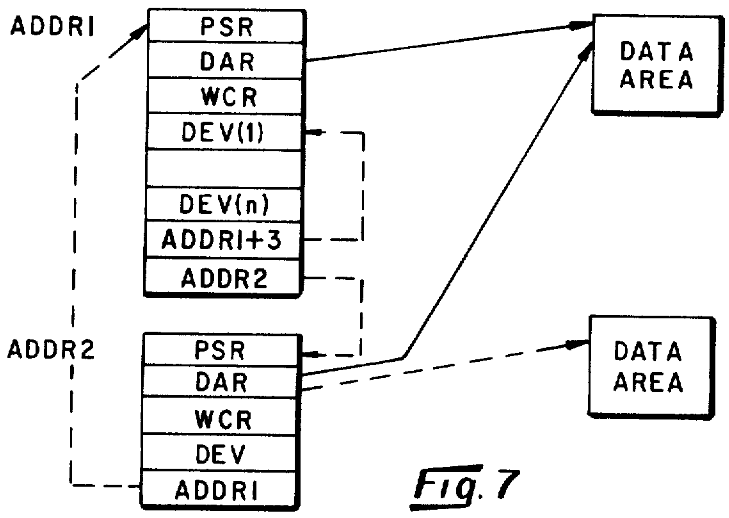

FIG. 7

PATENTED OCT 16 1973 3,766,526

SHEET 7 OF 7

MULTI-MICROPROGRAMMED INPUT-OUTPUT PROCESSOR

BACKGROUND OF THE INVENTION

The present invention relates generally to digital data acquisition systems and more specifically to a programmable input-output processor interface for direct computer memory access for a multiple channel data acquisition system.

The present invention was made during the course of, or under, a contract with the U. S. Atomic Energy Commission.

Instrumentation for measurement and control purposes is generally provided by modular units each of which performs an independent function. The increasing demand for data processing has generated a need for a modular system which communicates efficiently and in a standardized manner with a digital controller or computer.

With this in mind, the modular instrumentation system for data handling referred to as CAMAC has been generally accepted as the data processing standard, especially in the field of nuclear instrumentation. The CAMAC system features a data highway (or dataway) by means of which modules can communicate with each other, with computers and with computer peripherals. As many as twenty-three modules are placed in a crate which also contains a crate controlling system. The crate controller normally communicates with the computer or other digital controller directly or indirectly. The controller-to-module language is fixed and is not dependent on the computer used. However, the controller must be designed to communicate with the particular computer being used.

When a multiple crate system is necessary the controller of each crate is normally connected to a branch driver which communicates with the computer and provides a branch highway coupled to all of the crate controllers of the multiple crate system. A detailed explanation of the CAMAC system may be had by reference to IEEE Transaction on Nuclear Science, "CAMAC Tutorial Issue," Vol. 18, No. 2, April 1971.

The CAMAC branch drivers typically have been considered a necessary evil in the process of transferring data in a multiple crate CAMAC system to a computer. Such branch drivers are either entirely computer program controlled or may have one or two highly structured direct memory access data channels. For data rates encountered in Medium Energy Physics experiments, the program control scheme is much too restrictive since many useful types of data transfer can be identified.

Due to potentially high data rates, certain system constraints are obvious. The first constraint is that full analysis of all the data in real-time is not possible. The second is that even if no analysis is attempted, data acquisition is limited by the transfer rate to a semi-permanent storage medium, usually magnetic tape. Thus, there is a need for a data acquisition system which would remove the transfer-type restrictions and provide higher data transfer rates of selected data with as much real-time analysis as possible.

The microprogrammable input-output processor (MIOP) of this invention accomplishes the above by using efficient microinstructions with sufficiently small execution times so that the high transfer rates are attained. Many microprogramming methods have been suggested; from the elementary microinstruction where each bit represents a unique logic switch to a very complex set of microinstructions which contain several sub-microinstructions or nanoinstructions. The scheme chosen for this processor utilizes coded fields to permit a complete microoperation to be defined by sixteen-bit microinstructions.

SUMMARY OF THE INVENTION

In view of the above need, it is an object of this invention to provide a microprogrammed input-output processor for multiple channel data transfer into a host computer via a single channel direct memory access interface.

It is another object of this invention to provide a microprogrammed input-output processor for interfacing a multiple channel CAMAC data acquisition system to a host computer which frees the computer for as much real-time data analysis as possible.

Yet another object of this invention is to provide a data acquisition system as set forth in the above objects which will operate at very high data acquisition rates.

Briefly, the MIOP provides sixteen direct memory access (DMA) channels to a host computer via a single DMA interface. Command lists in computer memory select microprogrammed sequences, stored in a fast-access control memory, which transfer data between CAMAC devices and the lists in computer memory. Each of sixteen channels may have an individual command list which results in storage or retrieval from individual data lists. Chaining is permitted for both command and data lists. Channel microprograms are executed according to an assigned channel priority.

BRIEF DESCRIPTION OF THE DRAWINGS

FIG. 6 is an illustration of the various microprogram instruction sets stored in the control memory of FIG. 2.

FIG. 7 is an illustration of a computer command list format and chaining example for the system shown in FIG. 2.

DETAILED DESCRIPTION

Figure 1:
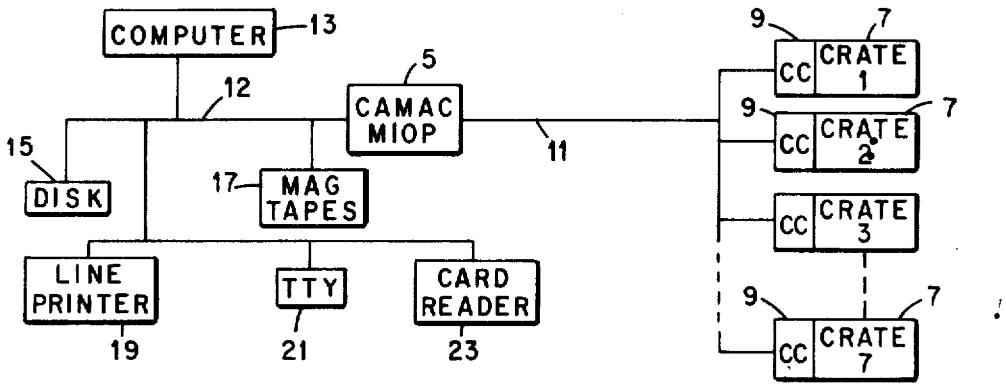
FIG. 1 is a block diagram of a CAMAC data acquisition system including the multi-microprogrammed input-output processor of the present invention.

Referring now to FIG. 1, there is shown a block diagram of a typical CAMAC data acquisition system including the multi-microprogrammed input-output processor 5 (MIOP). As pointed out above, the CAMAC system standard provides that crates 7 be provided which accommodate as many as 23 modules (removable circuit boards, not shown) and one crate controller 9 for each crate. The system represented here is a multi-crate system as indicated by the seven crates.

The modules may perform various functions such as accept data either in analog or digital form or transfer data or commands to peripheral devices, such as magnetic tapes, printers, servo controllers, etc. In the case of an analog data input the particular module contains an analog-to-digital converter to convert the analog data to digital form acceptable by the CAMAC system.

Each of the modules in a crate 7 is controlled by the crate controller 9 via the dataway. The dataway is the wiring that interconnects the modules. The dataway wiring is divided into three categories: data transfer, control, and power. For data transfer, 24 bit parallel undirectional data buses (highways) are provided. One is for data transfers from crate controller to module. The other is for module-to-crate-controller transfers. The crate controller 9 is then the master that controls the flow of signals in the crate. Each crate has 25 plug-in card positions, the 24th and 25th of which are reserved for the crate controller cards.

In order to operate the dataway, the crate controller 9 functions as an interface with access at the one face to the bused wires to each module of the crate, and access to certain individual module connections specified as "station lines" N which must be activated to communicate with a particular station (module) and "Look-At-Me" lines L by means of which the individual modules signal the crate controller that they need attention, such as an A to D conversion complete and ready for transfer. This action of the CAMAC system is well defined and further description may be had by reference to the IEEE publication referenced above.

The other face of the crate controller communicates with the system controller, which could be a computer or other digital control device, and, therefore, varies depending upon the system design. In a multi-crate system as shown in FIG. 1, the crates 7 are connected to a branch driver, in this case the MIOP 5, by means of a branch highway 11. The branch highway is a set of wires that interconnects the MIOP 5 and the crate controllers 9. Each crate controller gains access to the branch highway 11 by tapping onto the wires at connecting ports. The branch highway contains 66 pairs of signal and ground wires that carry all signals necessary for branch operation. These include timing and control signals as well as a twenty-four bit bidirectional data bus for read and write operations. The particular signal lines of the branch highway are outlined in the following table and will be referred to throughout this application. The line designations are standardized for CAMAC systems and well known by those familiar with the system.

The address command of the branch highway 11 is generally indicated as CNAF, where C represents the address of the selected crate, N is the address of the selected station, or module, within the crate, A is the selected sub-address within the module residing in the addressed station, and F is the function to be performed.

The ordinal form of the crate address is carried on the seven BCR wires. A seven position switch in the crate controller selects the address of that crate. No two crates may have the same address. This type of coding permits more than one crate to be addressed on a given command.

The station member N is carried as a five-bit binary coded number on the lines BN1 through BN16. The sub-address A is carried on lines BA1 through BA8 and the function code F is carried on lines BF1 through BF16 which are directly translated bit for bit into five dataway signals on lines F1 through F16 of the dataway (not shown).

The flow of data differs slightly depending on whether a read or write command is in progress. For a read command, the addressed module in the addressed crate places its data on the unidirectional dataway read bus. The data are transferred to the bidirectional branch highway BRW bus. During a write command, the data are placed on the BRW bus and the crate controller of the addressed crate retransmits the data on the write bus of its crate, where they are available to the addressed module in that crate.

The crate dataway includes two unaddressed commands, clear C and inhibit I, which are not specifically accounted for on the list of branch highway signals. These commands are provided by specially coded station N and sub-address F signals. These two commands have the unique characteristic of being addressed commands on the branch highway and unaddressed commands on the dataway.

It is often necessary for a module or modules in a crate to respond to a certain command request which is not a read-write command. This response is allocated a Q line in the dataway which corresponds to the BQ line of the branch highway. The Q response line of a crate is wire-OR'd onto the branch BQ line so that only the addressed crate is connected to the BQ line. For example, the Q response is useful for block transfers involving a series of modules.

TABLE.—SIGNAL LINES AT BRANCH HIGHWAY PORTS

| Title | | Designation | Generated by | Signal line pairs | Use |
|---|---|---|---|---|---|
| Command | Crate address | BCR1-BCR7 | Branch driver | 7 | Each line addresses one crate in the branch. |
| | Station number | BN1, 2, 4, 8, 16 | | 5 | Binary coded station number. |
| | Sub-address | BA1, 2, 4, 8 | | 4 | As on Dataway A lines. |
| | Function | BF1, 2, 4, 8, 16 | | 5 | As on Dataway F lines. |
| Data | Read/Write | BRW1-BRW24 | Branch driver (W) or crate controller (R, GL). | 24 | For Read data, Write data, and Graded-L. |
| Status | Response | BQ | Crate controller | 1 | A reply to certain request commands. |
| Timing | Timing A | BTA | Branch driver | 1 | Indicates presence of Command, etc. |
| | Timing B | BTB1-BTB7 | Crate controller | 7 | Each line indicates presence of data, etc., from one crate controller. |
| Demand handling | Branch demand | BD | Crate controller | 1 | Indicates presence of demand. |
| | Graded-I. request | BG | Branch driver | 1 | Requests Graded-L operation. |
| Common controls | Initialize | BZ | Branch driver | 1 | As on dataway initialize line (2). |
| Spare | Reserved | BX1-BX9 | | 9 | For future requirements. |

As pointed out above, the dataway provides 23L signal lines, one from each module or station to the crate controller. These L signal requests from the various modules are OR gated onto the branch demand line BD. Thus, BD = logic 1 signals the branch driver that somewhere in its system, there lies a module requesting attention. The branch driver then generates a command on a BG line which requests a graded-L request. BG requires all on-line crate controllers to participate in the generation of a 24 bit graded-L word (GL word), to be transmitted on the branch highway BRW lines. This 24 bit word is stored in a GLR register in the driver, as will be described hereinbelow, and is used to identify the particular module requesting service.

The above brief description of the CAMAC branch driver has been presented to aid in describing the operation of the microprogrammable input-output processor (MIOP) 5. Further details of the system which are incorporated herein by reference thereto may be had by referring to the above cited IEEE publication, particularly pages 19 through 25.

Referring again to FIG. 1, it will be noted that the output of the MIOP 5, shown here to include the CAMAC branch driver and computer interface, is connected to the input-output bus 12 of a host computer 13 which has been programmed to accept data and execute commands through the MIOP 5. Although other computers may be used with this system, it will be described for use with the PDP-11 supplied by Digital Equipment Corporation. Details for connection to the PDP-11 computer may be had by reference to a publication entitled "PDP-11 Handbook," 112X1269-AJO-F-11-50, 1970, by Digital Equipment Corporation, Maynard, Massachusetts. As shown in FIG. 1, the usual peripherals for data storage, read-in and read-out devices indicated by reference numerals 15 through 23, are coupled to the computer I/O bus 12 to complete an overall look at the data acquisition system.

Figure 2:
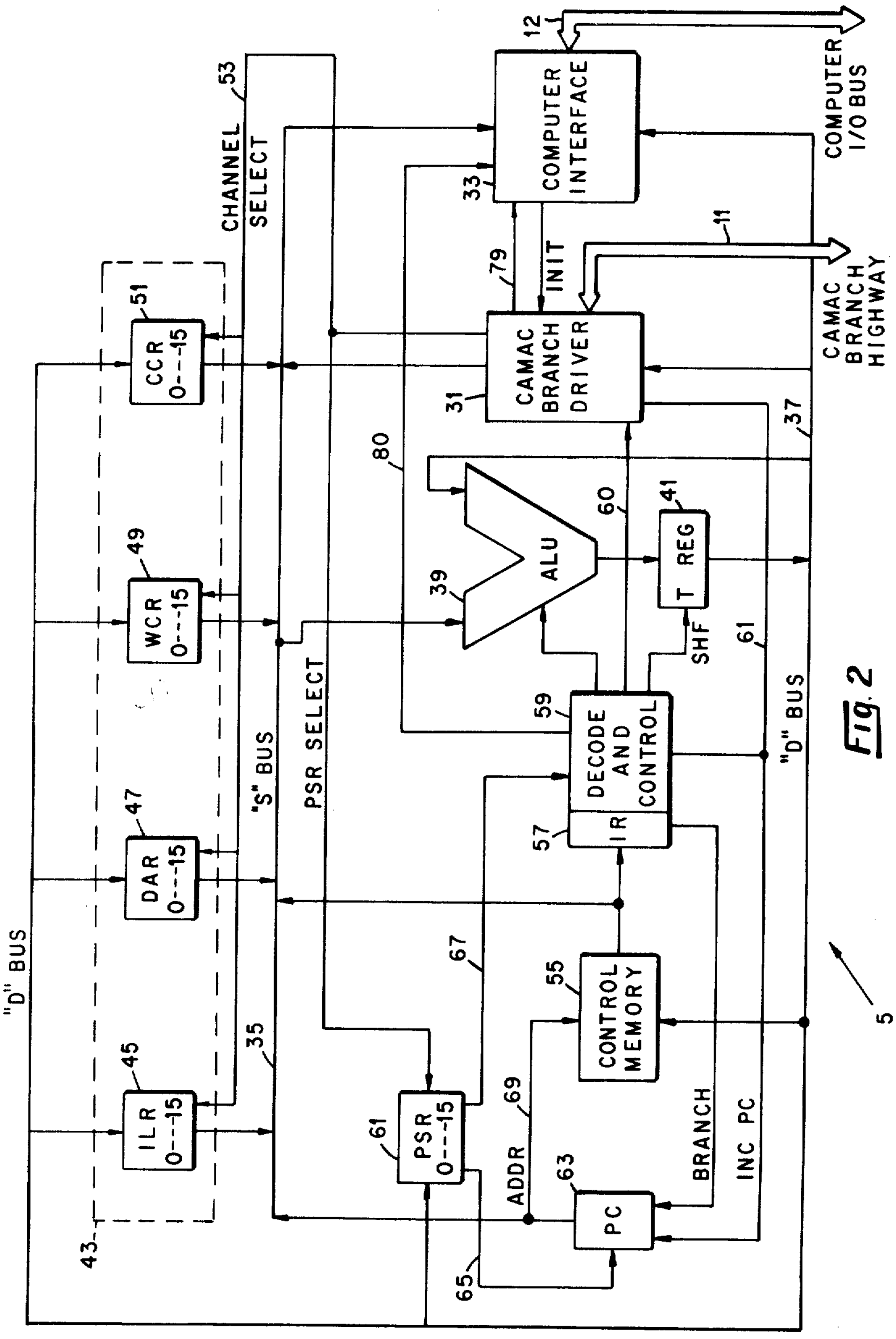
FIG. 2 is a block diagram of the processor shown in FIG. 1.

Referring now to FIG. 2, there is shown a block diagram of the MIOP 5 shown in FIG. 1 including the CAMAC branch driver 31 and the computer interface 33 which is connected to the computer I/O bus 12. The CAMAC branch bus or highway 11 (66 lines) from the seven crate controllers 9 connects to the CAMAC branch driver 31. Both the computer interface 33 and the branch driver 31 are connected unidirectionally to a system source bus S 35 via 16 lines and to a destination D bus 37 via 16 lines for 16-bit word transfers out of and into the driver 31 and computer interface 33, respectively. Both the "S" and the "D" bus contain 16 lines.

An internal arithmetic and logic unit (ALU) 39 is the central element of the MIOP 5. Both the "S" bus and the "D" bus are inputs to the ALU 39. The ALU 39 consists of four standard arithmetic and logic operation integrated circuits each circuit containing four channels for processing the 16 bit words, and one look-ahead carry generator. The arithmetic and logic units and the look-ahead carry generator are commercially available integrated circuits, such as the integrated circuit Models TTL 74181 and TTL 74182, respectively, supplied by Fairchild Semiconductor, Mountain View, Calif. Details as to the operation of these units may be had by reference to a Fairchild Semiconductor publication entitled "TTL Data Book" published June 1972. The ALU 39 will perform eight binary arithmethic or logical operations on two 16-bit words. The arithmetic operations are Increment, Decrement, Add, Subtract and straight Transfer. The logic operations are Inclusive OR, Exclusive OR and AND.

The output of the ALU 39 is connected to a "T" register 41 where results of an ALU operation are temporarily stored while being gated to the "D" bus. The "D" bus is the destination of all operations involving the ALU 39. The ALU allows transfers between any of the register connected to the buses in one microinstruction.

The primary function of the processor (MIOP) 5 is to multiplex and control 16 direct memory access (DMA) channels. The parameters pertinent to the DMA operation are stored in 64 file registers 43, all of which are connected to the "S" and "D" buses. The registers are organized in 16 groups of four registers, each group representing one of the 16 DMA channels. Each of the four registers of each channel is microprogram addressable and includes a command list instruction location register (ILR) 45, a data address register (DAR) 47, a word count register (WCR) 49, and a CAMAC command register (CCR) 51. The channel is selected by the branch driver 31 through channel select lines 53 connected between the branch driver 31 and each register 45 through 51.

The control memory 55, typically a 256-word, sixteen-bit, read/write memory (four 64 word memory cards) with an approximately 100 ns access time, contains the microprograms that define the data transfer sequence. If dynamic microprogramming is not required, a read-only memory may be substituted. The control memory 55 is connected to the "S" bus via 16 lines, to the "D" bus via 16 lines and an instruction register 57 which is coupled with a decode and control unit 59. The decode and control unit 59 consists of a 10 MHz clock driving a timing sequence generator, operation field decode logic, C field (control or condition test) decode logic, source field decode logic, and destination field decode logic. Specific instruction timing sequences will be described later, but generally the decode and control unit 59 provides the necessary control pulses to select one of 16 operations, select one of 16 control pulses or test lines, select one of 16 registers to connect to the "S" bus, and select one of 16 registers to connect to the "D" bus. During the execution of each instruction a program counter (PC) 63 is incremented via the INC PC line connected between unit 59 and PC 63 so that the next sequential instruction in CM 55 is addressed. In the special case of a branch instruction (BRT or BRF) the PC 63 is incremented as above if the condition is not satisfied. However, if the condition is satisfied the low order eight bits of the IR 57 are transferred to the PC 63 via an eight-line branch bus, and the instructions are executed starting at the designated address in CM 55.

The remainder of the MIOP 5 consists of a program selection register (PSR) 61. The PSR 61 is a sixteen channel register similar to one of the file registers 43 and the channel is selected, as are the file registers, by the channel select lines 53 connected from the CAMAC branch driver 31 to the PSR 61. The PSR 61 contains the address in control memory 55 of the transfer microprogram. This address is loaded into the program counter (PC) 63 via line 65 connecting the eight low order bits directly to the PC 63 as the initial step of a channel transfer sequence. The high order bits of the PSR 61 are connected to the decode and control unit 59 via line 61 where they may be tested by the control microprogram to select alternative program options such as one or two word transfers, interrupt upon list complete, etc.

The PC 63 is connected to the control memory 55 via eight address (ADDR) lines which select one of the 256 CM 55 locations. This addressed location may contain the instruction to be executed next or it may contain a 16-bit data word.

Figure 3:
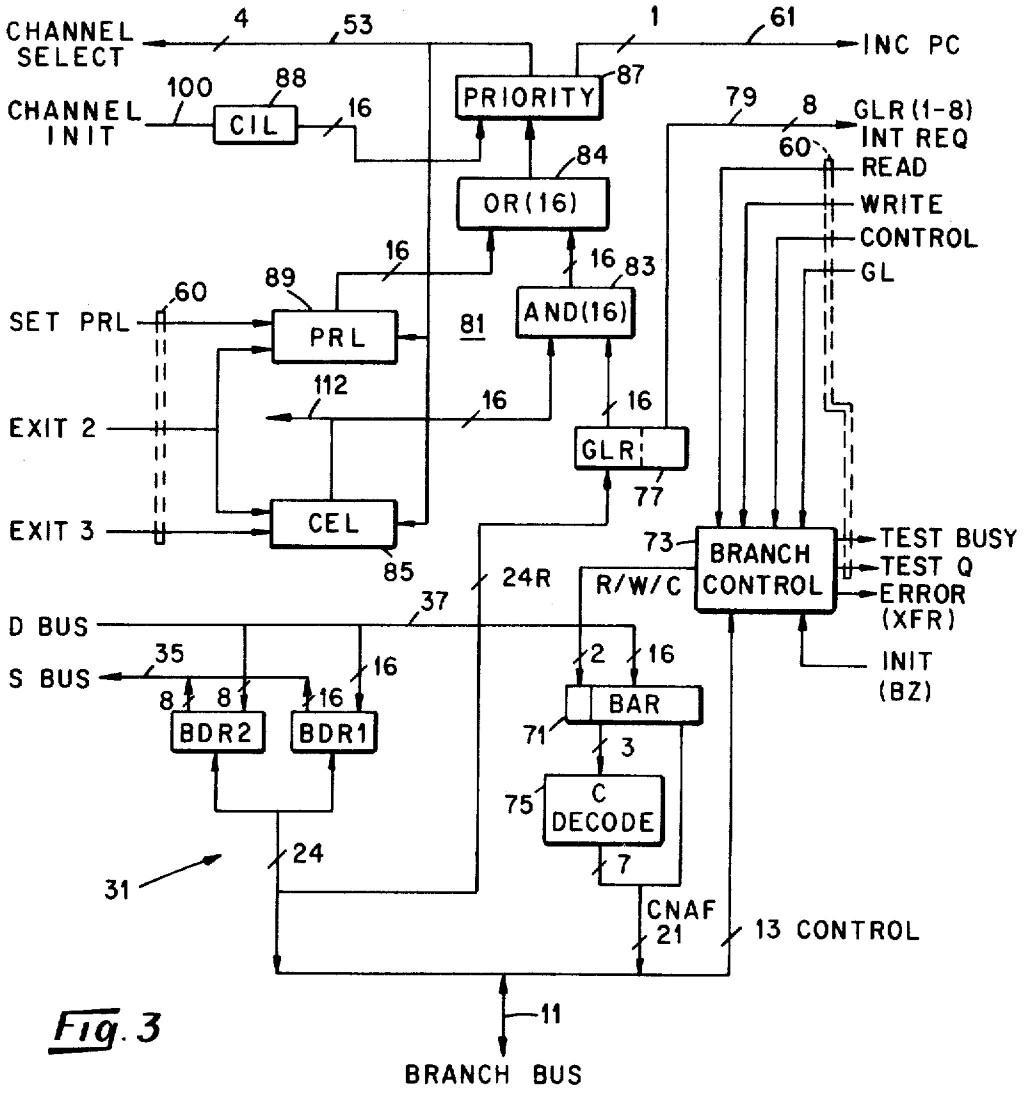
FIG. 3 is a block diagram of the CAMAC branch driver of FIG. 2.

Referring now to FIG. 3, there is shown a detailed block diagram of the CAMAC branch driver 31 with like reference numerals indicating the connections shown in FIG. 2. As pointed out above with reference to the Table, the branch highway or bus 11 contains 66 lines of which 24 (BRW1 through BRW24) are assigned to data read/write and graded-L (coded module address of the addressed crate 7), twenty-one are assigned to CNAF command code and twelve lines for control. The BRW lines are connected to branch data registers BDR1, a 16-bit register, and BDR2, an eight-bit register, to provide a total of 24 bits. Since the register provides bidirectional data transfer, they are similarly connected to both the "S" bus 35 and "D" bus 37. On the branch side both registers are selected simultaneously for a 24 bit transfer. Each register is selected separately, however, for transfer within the MIOP system 5 or transfer to sixteen-bit computer core memory. The CAMAC commands (CNAF) are set in an 18-bit branch address register (BAR) 71 which has sixteen lines connected to the "D" bus 37 and two lines connected to a branch control circuit 73 which supplies the type of command (read, write and control/test, F8 bit in the BAR 71). The BAR 71 contains the CAMAC commands including a three-bit binary crate select field, and high order function bits supplied by branch controller 73. The three bits from the BAR 71 containing the condensed crate select C code are connected by three lines to a C decode circuit 75 which provides the seven lines BCR1 through BCR7 for the crate address as shown in the table. The remainder of the crate command lines are taken directly from the BAR 71 to provide the total 21 lines necessary for the CAMAC address. The 21 lines are connected to the branch bus 11. The remaining control functions outlined in the table are provided through the 13 lines connecting the branch controller 73 to the bus 11.

As shown in FIG. 3, the twenty-four BRW lines are also connected to a 24 bit graded-L register (GLR) 77. During a graded-L cycle, a 24 bit word carrying information on the status of L request in the branch is gated onto the BRW lines from the various crates 7 when enabled by a BG request signal on the BG control line, one of the 13 control lines from the branch controller 73. The BG request requires all the crate controllers 9 to participate in the generation of the 24 bit graded-L word. Then by examining the contents of the GLR 77, the identity of the requesting module of the various crates is determined and a priority assigned. The high order 16 bits of the GLR 77 are assigned to data channel transfer requests. The lowest eight bits of the GLR 77 are transmitted via eight lines 79 directly to the computer interface 33 as the processor interrupts requests.

A priority network 81 is provided which consists of 16 AND gates 83 each having an input connected to one of the 16 high order bits of GLR 77 and the other input connected to corresponding ones of 16 lines from a channel enable latch (CEL) 85. The outputs(16) from the AND gates 83 are connected to 16 inputs of a corresponding 16 OR gates 84 shared with a corresponding 16 inputs from the outputs of a program request latch (PRL) 89. The outputs of the 16 OR gates are connected to a priority selector 87 which has an additional 16 inputs from a channel initialize latch (CIL) 88. The GLR 77 is arranged such that the 24th bit is the highest priority which can indicate one or more than one graded-L code from one or more crates as the highest priority. The priority unit 87 includes four input priority encoder integrated circuits such as the Model 9318 supplied by Fairchild Semiconductor with control logic and an output latch. Details as to the operation of this circuit may be had by reference to the above-cited Fairchild Semiconductor publication. In this unit 32 input lines from AND 83 and the CIL 88 are encoded into a five-bit binary representation of the highest priority input line that is enabled. The higher order four bits provide channel select via lines 53. The lowest order line 61 designates whether the source is a CAMAC demand or a processor demand. Line 61 is connected to the increment input to PC 63, as shown in FIG. 2. By convention, the encoded channel selection numbers are odd for a processor demand and even numbers for a CAMAC demand. Therefore, line 61 is activated on processor demand to increment the PC 63, which has been reset to zero during the arbitration of the priority so that the program execution begins at location 1 of CM 55 rather than location 0 as for a CAMAC demand. Thus, the priority levels are assigned in pairs, i.e., level 15 processor, level 15 CAMAC; level 14 processor, level 14 CAMAC, etc. Once the priority has been established, the selected module transfer microprogram is executed and one of the 16 DMA channels is selected by means of the coded signal on the four channel select lines 53. Thus, one channel of the file registers 43 is selected for the data transfer. The purpose of the PRL 89 is to allow a programmed transfer interrupt if the microprogram is too long to be completed within a specified time. The program may generate a programmed graded-L cycle, set its PRL bit and execute an exit 1. This allows higher priority requests to obtain service. If no higher level request is present, the exited program continues execution. The normal program exit (exit 2) resets the PRL 89 bit and sets the CEL 85 bit for that data channel. The CEL is reset by exit 3, which disables recognition of a priority request on that channel. Exit 3 is generally used after an operation complete interrupt is executed so that no further requests of the same priority can be accepted until the channel is reinitialized. As the last logical instruction of a microprogram one of the exits mentioned above must be executed. An exit command may be part of any normal instruction, and it is executed at the completion of that instruction. Exit 1, Exit 2, or Exit 3 will be executed if the control field in the instruction has the respective value of 8, 9, or 10, as decoded and presented to corresponding outputs of the decode and control unit 59.

The branch controller 73 provides the conventional CAMAC branch control sequences. The processor 5 is in complete control of the CAMAC system through the branch controller 73. The read, write, and control inputs as well as the graded-L request (GL) and exit inputs are connections from the decode and control unit 59 via line 60 (FIG. 2). The initialize (INIT) command from the computer interface 33 signals the branch controller 73 to generate "BZ" commands to the branch highway, the only unaddressed command. CAMAC branch highway conditions may be tested by designating appropriate field values in a micro-processor branch (BRT or BRF) instruction. A busy test will indicate if a CAMAC operation is complete. A Q test will indicate if certain previous operations as defined by the CAMAC standard were valid. If for any reason a CAMAC sequence could not be completed the error line will trigger an interrupt to the host computer.

Figure 4:
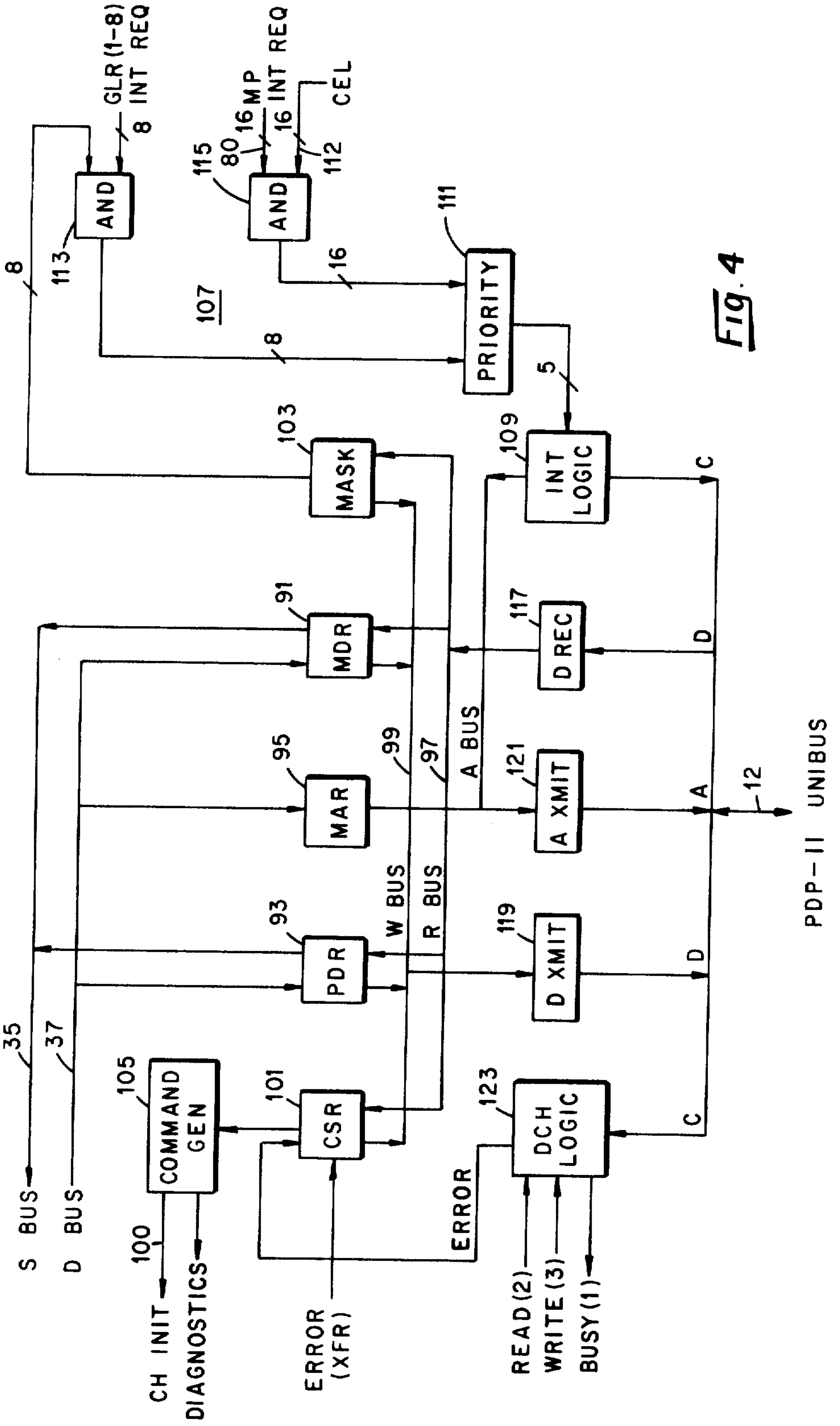
FIG. 4 is a block diagram of the computer interface of FIG. 2.

Referring now to FIG. 4, there is shown the computer interface 33 of FIG. 2. The "S" bus 35 and the "D" bus 37 are both connected to a memory data register (MDR) 91 and a program data register (PDR) 93. The "D" bus is further connected to a memory address register (MAR) 95. MDR 91 and PDR 93 are also connected to the computer interface read (R) and write (W) buses 97 and 99, respectively. The buses 97 and 99 are connected to a control and status register (CSR) 101 and a MASK register 103. The CSR 101, the PDR 93 and the MASK register 103 may be given any device address allowed by the computer and are used to initialize the processor 5, that is, load the control memory 55 of the processor from the computer 13 and read it to verify correct loading. They may also be used in the single cycle (manual) mode for controlling and testing the processor. All the registers 91 through 101 are sixteen-bit registers. Register 103 is an eight-bit register. The MDR 91 and MAR 95 are the direct memory access (DMA) channel registers and are controlled from the processor. The processor 5 is bus master during all DMA transfers.

Figure 5:
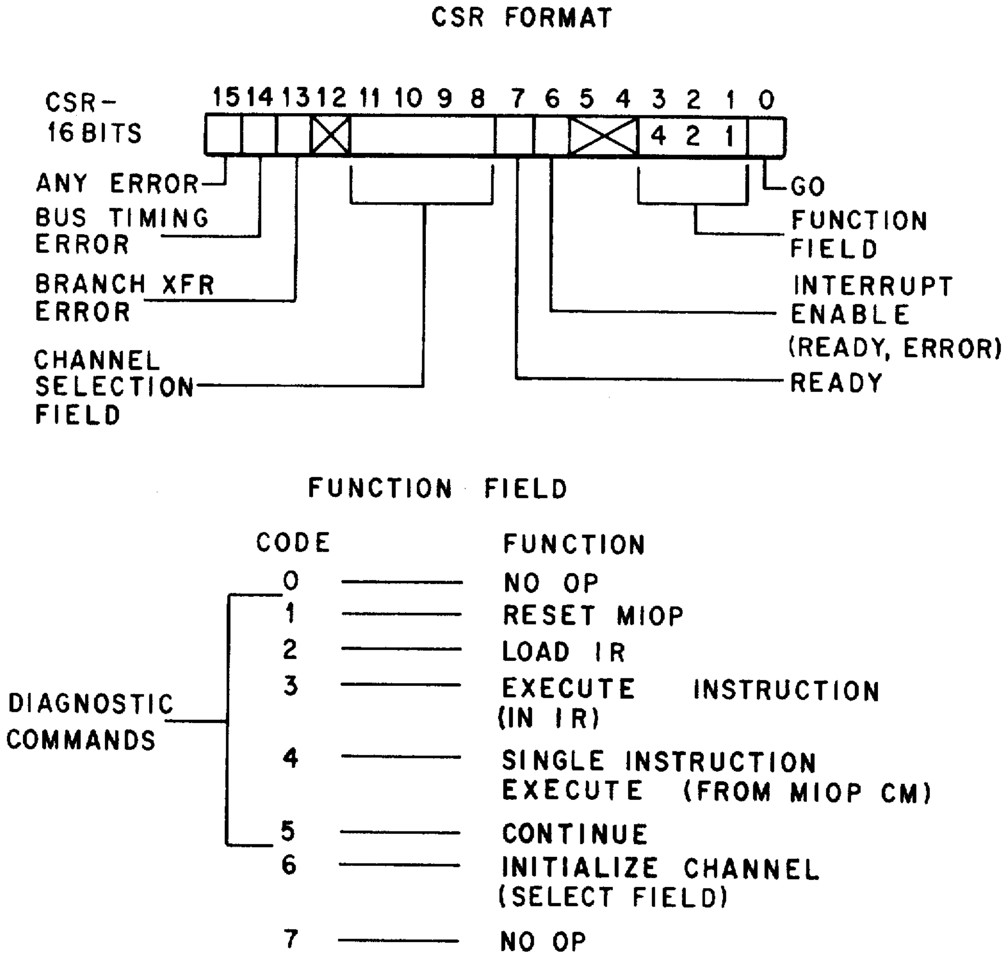
FIG. 5 is a diagram of the format for the CSR register shown in FIG. 4.

Bits one through three of CSR 101 are connected to a command generator 105 which generates the diagnostic commands shown in FIG. 5 (connection not shown). The three-bit field allows eight possible functions of which six are assigned. The reset MIOP 1 command will put the MIOP in the single cycle mode and will clear all request registers and will generate an initialize (BZ) signal to the CAMAC branch control 73 (FIG. 3). The load IR (2) and execute IR (3) commands are used for loading and verification of CM 55 and for the execution of single microprocessor instructions from the host computer. The single instruction execute (4) will execute one instruction in CM 55 designated by the current address in the PC 63. The continue (5) command will cause a program in CM 55 beginning at the current address to be executed to its normal completion. The initialize channel (6) command will set a bit in the CIL 88 (FIG. 3) via line 100 which represents the channel selected by CSR 101 bits eight through 11. When this selected channel's demand is the highest priority the value in the PDR 93 will be considered the address of a command list in core memory which will be accessed through the unibus 12 by the microprocessor initialization program stored in CM 55.

A priority interrupt circuit 107 is provided in which 25 interrupt priority levels are provided. These levels are encoded into the computer interrupt logic 109 through a priority code selector 111 via five lines. The highest requesting level is encoded by the priority network 107 into an interrupt vector address which selects the service program. The eight lines from the eight GLR 77 (FIG. 3) interrupt requests are compared with eight lines from the MASK register 103, which is under computer control, in an AND gate circuit 113 whose eight output lines are connected to the priority circuit 111. Another 16 channel-dependent interrupts may be triggered by the interrupt request 11 command in the control field of any normal instruction as decoded and presented to 16 output lines of the decode and control unit 59. These 16 lines 80 (FIG. 2) are compared with 16 lines from CEL 85 via line 112 (FIG. 3) in an AND gate circuit 115. The 16 outputs from AND gate 115 are connected to 16 additional inputs of the priority circuit 111. The 25th and highest priority interrupt is an error interrupt (XFR error) from the branch controller 73 or the DCH logic 123. These interrupt sources are identified by bits 13 and fourteen of CSR 101. Bit 13 designates a branch transfer error and bit 14 designates a unibus 12 transfer error. The priority network 111 is similar to priority unit 87 previously described. The interrupt logic circuit 109 is a standard PDP-11 interface module and further discussion of this operation may be had by referring to Digital Equipment Corporation PDP-11 handbook, referenced above.

The remainder of the circuit of FIG. 4 includes the standard unibus receiver 117 and unibus driver 119 coupling the buses 97 and 99 to the PDP-11 unibus 12 and an address bus driver 121 coupling the MAR 95 to the unibus 12. The DCH logic 123 consists of a Digital Equipment Corporation DEC M796 unibus master control module and the remaining half of a DEC M7821 interrupt control module with control logic to modify the standard NPR control scheme to permit multiple word transfers. A discussion of the operation of these modules may be had by referring to the above-referenced Digital Equipment Corporation PDP-11 handbook. Read 2 and write 3 commands from the micro-processor instruction sequence via the decode and control circuit 59 cause appropriate unibus transfers and the status of the transfer sequence can be tested for operation complete by a branch on busy 1 test instruction to the decode and control unit 59.

The first step in initializing the system is to load the control memory (CM) 55 (FIG. 1) with the microprograms required to control the 16 DMA channel file registers 43 and the CAMAC system during the run mode of operation. The control memory 55 is loaded and checked using the single cycle (manual) mode of operation of the processor 5 through the CSR 101.

The single cycle mode is initiated by a reset 1 command in the function field of CSR 101. In the single cycle mode the MIOP 5 can be given commands through the function field bits of the CSR 101 as outlined in FIG. 5. The controlling source through the CSR 101 may be a program transfer from the computer or from a manual control panel (not shown). The operations of the MIOP 5 are synchronized by a standard clock system (not shown) which provides a basic cycle time of 300 nsec.

The microprograms stored in the CM 55 define the various DMA transfer sequences. The microprogrammed transfer sequences are constructed using the instruction sets as illustrated in FIG. 6. Each field in the 16-bit instruction is four bits wide except the absolute address (ADDR) field in the branch and memory access instructions which is eight bits wide. All instructions except LD (LOAD) and STO (STORE) are executed in one cycle (300 nsec.). The LD and STO require two cycles. There are 16 control functions which include computer core memory read and write, CAMAC branch read, write, control, and graded-L cycle, and various internal MIOP 5 operations. The selected control function is executed after a destination transfer. The various conditions that may be tested by the branch (BRT and BRF) instructions include ALU 39 status conditions such as carry, negative, or overflow on the previous operation. CAMAC status conditions such as busy and Q flag and DCH status conditions such as busy may also be tested.

Once the microprograms have been stored in the CM 55 a data channel operation may be initiated. Data channel initialization is accomplished by the computer 13 transferring the beginning address of a core-resident command list to the program data register (PDR) 93 and a channel initialization 6 command with the desired channel in the select field to the CSR 101. The MIOP 5 gains bus control, then accesses the command list and loads the PSR 61 and the dedicated file registers 43. The command list format is shown in FIG. 7. This standard initialization process is executed by a microprogram common to all channels.

Before CAMAC transfers are permitted the CAMAC system must be initialized. This can be done by execution of a list of CAMAC commands on a data channel. The exact type and number of CAMAC initialization commands depends upon the system configuration. The typical types of commands are: enable branch demand (BD) in each CAMAC crate controller 9, clear the inhibits, enable L's in the crate 7 modules, and set up control registers in the crate 7 modules.

When channel initializations are completed, device transfers can either be made automatically until word counts are satisfied as in the CAMAC initialization sequence above, or they can be triggered by a CAMAC branch demand as will be explained later.

Command list chaining allows sequential access to a number of physically separated core-resident command lists. This is allowed when the chain enable bit of the program select word (register PSR 61) is set. The low byte of the PSR 61 is connected to the program counter register 63 and contains the address of the service program in CM 55. Bits of the high order byte are tested by the control program in the decode and control unit 59 to determine alternative procedures to be executed. When the last device in a selected sequence or the last transfer to a single device is detected, the ILR 45 of the file register 43 is loaded with the address of the next word of the computer core memory command list. This may cause the repeat of the selected sequence if the start of the device loop is specified, or it may cause the same or different command list to be executed. In FIG. 7 a possible sequence is illustrated. This command list labeled ADDR 1 will input data from an arbitrary sequence of CAMAC device addresses. WCR 49 is the loop counter in this case. Each time the sequence is executed, the loop counter will be decremented. When WCR 49 is zero the command list at ADDR 2 will be executed. This may write from the same or a different core memory area to a single CAMAC device such as a scope display. All of this is accomplished without computer assistance. The CAMAC command register (CCR) 51 contains the CAMAC function and CAMAC device address, as explained above, minus the F8 bit, which is supplied by the type of control command that loads the CCR 51 command into the branch address register BAR 71.

After initializing the processor 5, operation may begin by making a channel request. Each of the sixteen channels has two sources: the computer and a GL request in the CAMAC system. The computer request is higher priority than CAMAC. The sixteen channels have a priority structure 0–15 with channel 15 the highest priority. With the selection of a channel the group of four file registers 43 associated with that channel are given access to the "S" and "D" buses. During the arbitration of the priority the program counter PC 63 is reset to zero; if the channel selected to run has as a source the computer, then the PC register 63 is incremented. A minimum of 150 nsec. delay between incrementing the PC 63 and the first read of the control memory 55 allows sufficient time for the memory addressing to stabilize.

The basic operation of the processor is that a channel is selected and if its source was a CAMAC crate 7, then the instruction in control memory 55 location zero is executed. Location zero contains a RTN instruction, which is a return via low byte in PSR register 61. This allows each channel a link to its own microprogram. If the source was the computer then execution will start at location 1 of control memory 55. Starting at location 1 will be a file register 43 initialize routine using channel transfers. This requires approximately 18 instructions for the four file registers in a group, and is used by each channel during system initialize to load all the file registers and is used as required by channels to reinitialize during the run phase. A data transfer is made from the particular crate 7 module which has been established as having the highest priority and the appropriate one of the 16 channels has been selected for that transfer. First the data word is transferred to the branch data registers BDR 1 through 2; then this word is transferred via the same bus S by a "MOVE" instruction through the ALU 39 to the T register 41 from which it is transferred via the destination bus "D" to the MDR 91. The address for this data is provided by the DAR 47 and in another instruction is transferred in the same manner to the MAR 95. In this instruction a DCH write 3 command will be in the control field. This will initiate a transfer into computer 13 core memory from MDR 91 via unibus 12. In a similar sequence a DCH read 2 command will transfer from computer 13 core memory to the MDR 91. Then a microprogram will move the data from the MDR to the BDR 1 through 2 and initiate a CAMAC branch transfer. This is all done without the assistance of the computer 13. When a transfer sequence is completed, then an end-of-block interrupt for that channel is sent to the computer by an interrupt request 11 control command that can be issued by any normal microinstruction. The computer recognizes the interrupt and issues a channel request that will reinitialize that channel, if that is desired.

Once the processor 5 is executing a program it cannot be interrupted and will relinquish control to the channel request logic by executing one of three exit control commands. Two types of exits generated by control commands in normal instructions are required to establish the desired control of the registers in the channel select logic 81. The two registers are: the program request latch (PRL) 89 and the channel enable latch (CEL) 85. The PRL register 89 can be selectively set with a control command and can be selectively reset with an exit 2 command. The PRL 89 is used to hold a channel request while giving up temporary control to the channel select logic by issuing an exit 1. If a channel of higher priority is not requested, then control will return to the channel in the PRL 89. Control will eventually return, even if other higher priority channels take the processor 5 for periods of time, when PRL 89 is the highest priority. The CEL register 85 is a MASK register for the 16 channel requests originating in CAMAC. An exit 2 will do a selective set of CEL 85 which is the way of enabling that channel. Exit 3 will cause a selective reset of CEL 85 and is used at the end of the list when chaining.

The operation of the processor 5 is such that any exit causes a temporary stop. If there is no request, the unit remains in the stop mode until a request is made from either the computer or CAMAC. If there is a request from CAMAC (BD) then a BG (see the table) operation is automatically started and the channel select logic 81 waits for completion of the GL cycle before priority is arbitrated.

Figure 8:
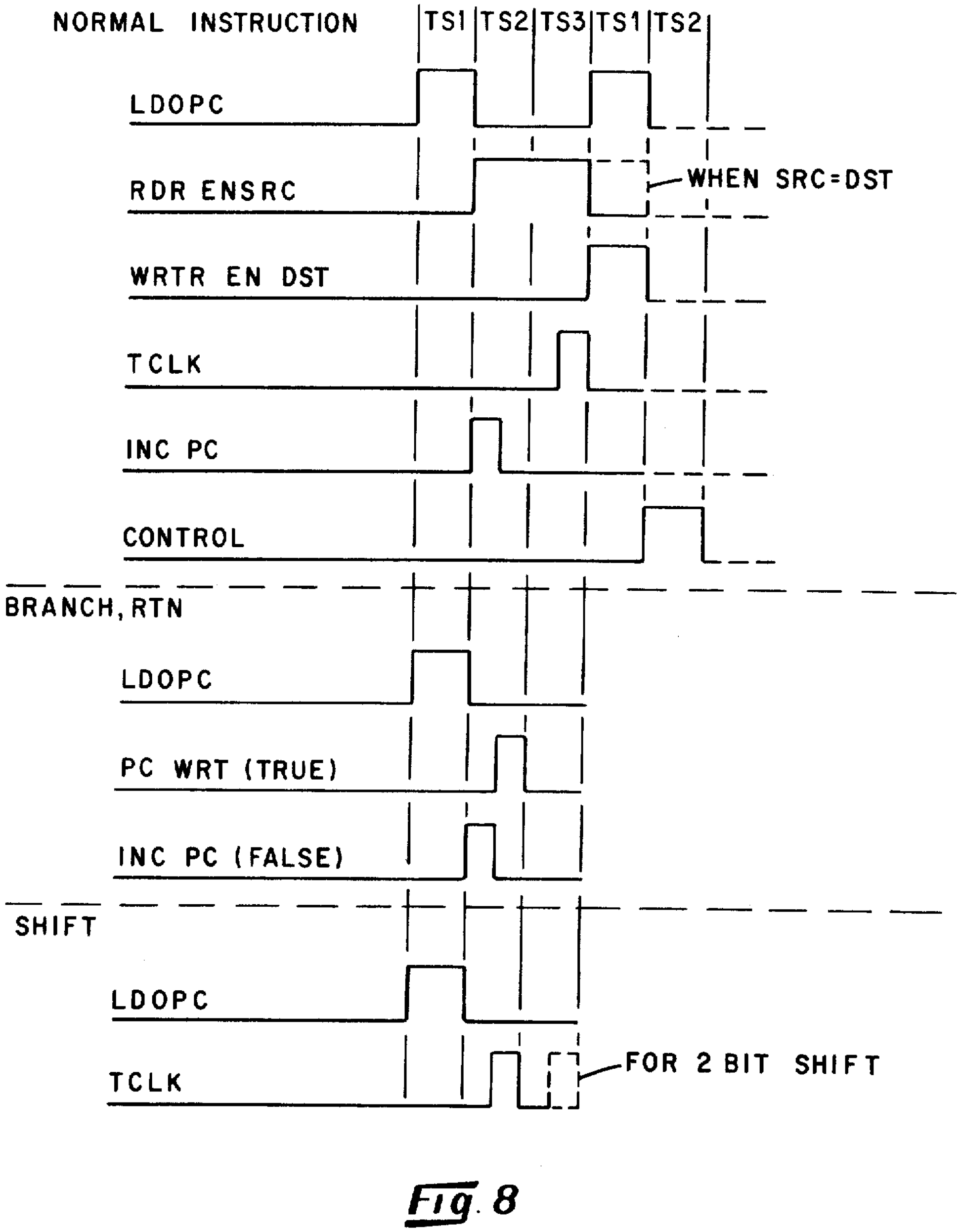
FIGS. 8 and 9 are timing diagrams for the various instruction sets shown in FIG. 6.
Figure 9:
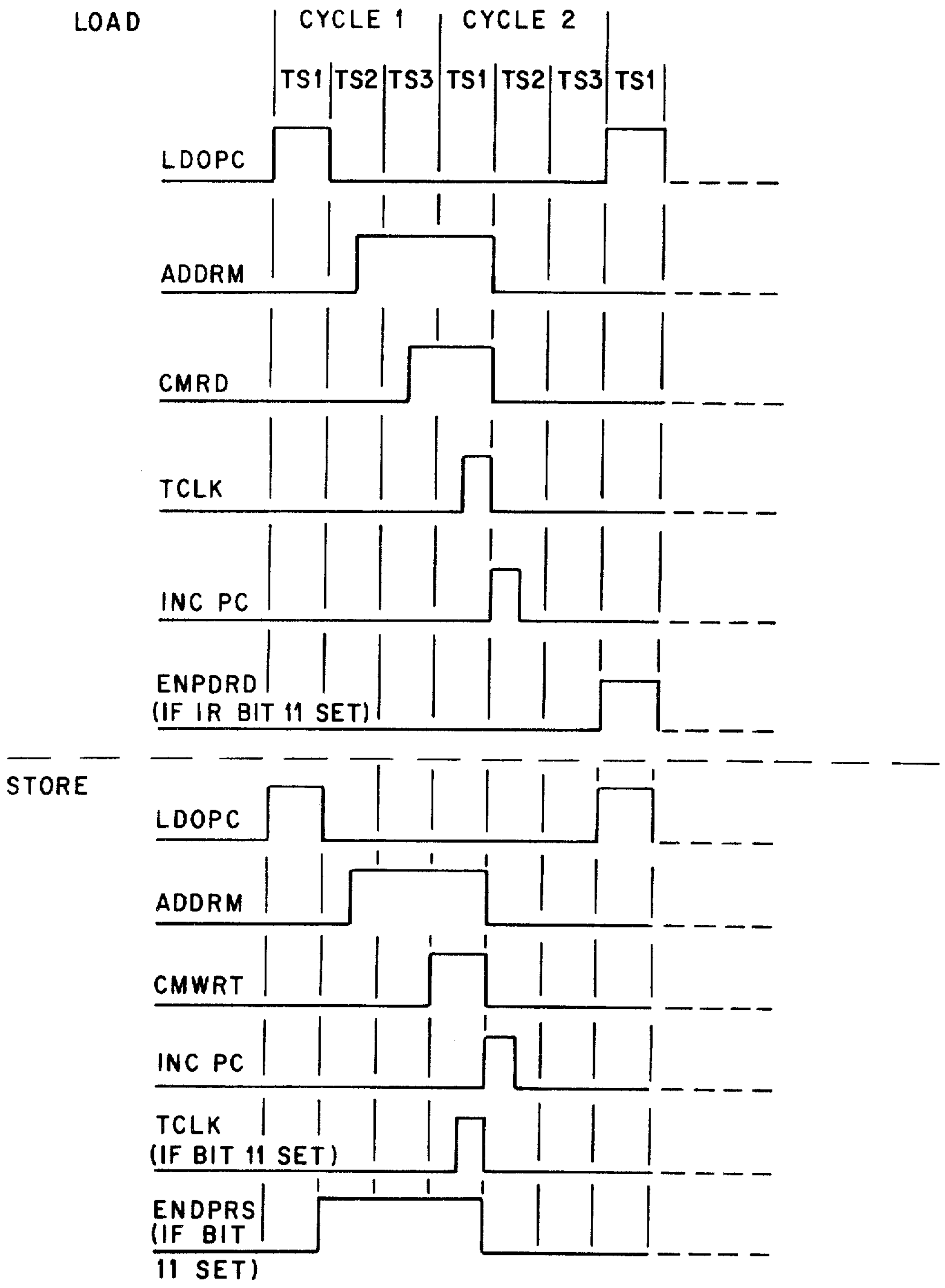

The timing diagrams for the system are shown in FIGS. 8 and 9. The basic clock for the MIOP 5 is an adjustable 10 MHz oscillator (not shown) which is on whenever power is applied to the unit. The basic timing is derived from a three-stage ring counter (not shown). If the clock is set at 10 MHz then the three sub-cycles of the counter are 100 nsec. each. By proper gating of the counter sub-cycles TS1-TS3 with the clock and not-clock signals, then any of six 50 nsec. increments of time can be obtained.

The timing for a normal instruction is shown in FIG. 8. During TS1 the instruction is loaded into the IR 57 and decoded in unit 59. At TS2 a source register is enabled to the "S" bus and the PC counter 63 incremented. During TS2 and the first half of TS3 the ALU 39 operation takes place and at the last half of TS3 the output of ALU 39 is loaded into the T register 41 and gated to the "D" bus. At TS1 of the next instruction the data on the "D" bus are enabled to the register selected by the destination (DST) field. If a control command is programmed this occurs at TS2 time. Note that the destination transfer and the control operation are overlapped with decode and execution of the following instruction which results in execution of a 500 nsec. sequence in 300 nsec.

The other instructions require some different and special timing. The BRT, BRF, and RTN instructions (FIG. 6) are very simple and require only TS1 and TS2. At TS1 the IR 57 is loaded and decoded. At TS2 the PC 63 is incremented or loaded with the low byte of the IR 57, whichever is correct for the condition tested. The RTN instruction is the same except at TS2 the low byte of PSR 61 is loaded into the PC 63.

The shift (SHF) instruction operates on the T register 41, and results in a one or two bit, right or left, normal or rotate shift in 300 nsec. For a one bit shift only the TCLK pulse at TS2 is used. For a two bit shift a TCLK pulse at TS3 is also generated.

Referring now to FIG. 9, the LD and STO instructions are shown to require two cycles. A normal load reads from control memory 55 the word addressed in the low byte of the load instruction and stores that word in the T register 41. If bit 11 T in register 41 is set in the load instruction then the word loaded in T register 41 will be also loaded into the PDR register 93. Store instruction is the reverse operation of load. For normal STO the word in T register 41 is stored in memory location addressed by low byte of instruction in IR register 41. If bit 11 is set the word in PDR 93 is transferred to T register 41, then to memory as in a normal instruction. The load and store from PDR 93 option is the path for loading and checking the control memory 55 programs.

In addition to acting as the interface between the computer and the CAMAC branch, the MIOP 5 performs many of the duties normally required of the central computer processor. System activities such as the "Look-At-Me" searches, display generation, data validity checking, and even simple analysis can be performed by the MIOP. This sharing of duties between the central processor and the MIOP results in much more of the computer time being available for real-time data analysis. For a typical CAMAC dataway activity rate of 100K operations per second, of which 12K words per second are transferred to tape, more than 85 percent of the computer time is available for data analysis.

Typical transfer microprograms require about 16 control memory locations. As an example of execution times, transferring the contents of a constant CAMAC device address to a data list in computer memory requires 3.6 microseconds. An increment memory microprogram which also checks for out-of-range addresses and channel overflow requires 6.6 microseconds. Total concurrent rates from all channels can approach 250 thousand words per second.

What is claimed is:

1. In combination with a CAMAC multiple channel data acquisition system including a plurality of crates each containing a plurality of data channel modules and a crate control means for controlling the operation of each of said plurality of data channel modules and the transfer of data into and out of said data channel modules, a microprogrammable input-output processor for multiplexing data channels of said multiple channel data acquisition system through a plurality of direct memory access channels to a host computer via a single direct memory access interface in which command lists stored in the computer memory select microprogrammed sequences which transfer data between the multiple channel data acquisition system and data lists in the computer memory, comprising:

- a source bus;
- a destination bus;
- a computer interface connected to said source bus and said destination bus for providing computer access to said buses;
- a control memory means having access to said source bus and said destination bus for storing data transfer microprograms in the form of instruction sets for controlling the transfer of data between said multiple channel data acquisition system and said computer interface;
- an instruction register coupled to said control memory means for accepting instruction sets from said control memory means to be executed;
- a decode and control circuit connected to said instruction register for generating control signals at respective outputs in accordance with said instruction sets to execute transfers of data through said processor under control of a selected one of said microprograms;

a multiple channel file register means corresponding in number to said plurality of direct memory access channels and accessible by said source bus and said destination bus for storing information from lists in said computer to control and address data transfers through said processor;

a channel priority selection means for determining the highest priority channel of said multiple channel data acquisition system requesting service and selecting the corresponding channel of said multiple channel file register for initialization of a data block transfer between one of said channels of said multiple channel data acquisition system and said host computer; and means controlled by said decode and control circuit for performing programmed digital arithmetic and logical operations on data word transfers between said source bus and said destination bus and transferring the assigned computer address for said data word transfers from said multiple channel file register means into said host computer.

2. The processor as set forth in claim 1 wherein each of said channels of said multiple channel file register means includes a word count register connected between said source bus and said destination bus for storing the count of words of a data transfer to determine the end of a data transfer between said CAMAC system and said computer; a data address register connected between said source bus and said destination bus for addressing said words of a data transfer into said computer, a CAMAC command register connected between said source bus and said destination bus for storing the CAMAC module address and function for a data transfer between the addressed module and said computer and a command list location register connected between said source bus and said destination bus for storing the address of the computer memory command list for said data transfer between the addressed CAMAC module and said computer.

3. The processor as set forth in claim 2, further including a multiple channel program select register having a number of channels corresponding to said plurality of file register channels connected to said destination bus for storing the address in said control memory means of said data transfer microprograms for each of said plurality of direct memory access channels, said priority selection means having an output connected to said program select register for selecting one of said multiple channels of said program select register corresponding to the selected channel of said multiple channel file register means and a program counting means responsive to the selected program address of said program select register for controlling the execution of the addressed program from said program select register during said data channel transfer sequence of the selected one of said multiplicity of data channels.

4. The processor as set forth in claim 3 wherein said priority selection means further includes means for selecting one of said data channels for data transfer upon a request from said computer.

5. The processor as set forth in claim 4 wherein said control memory means is a read/write memory and said computer interface includes means for loading said memory from memory lists in said computer and initializing the selected one of said multiple channel file register means for a selected data channel transfer between said computer and a selected channel of said multiple channel data acquisition system.

6. The processor as set forth in claim 5 further including a temporary storage register connected between the output of said arithmetic and logical operation means and said destination bus, said storage register having a control input connected to a control output of said decode and control circuit.

* * * * *